Dec. 31, 1957  J. P. CHAYKA  2,818,001
BROACHING MACHINE
Filed Jan. 16, 1956  5 Sheets-Sheet 1
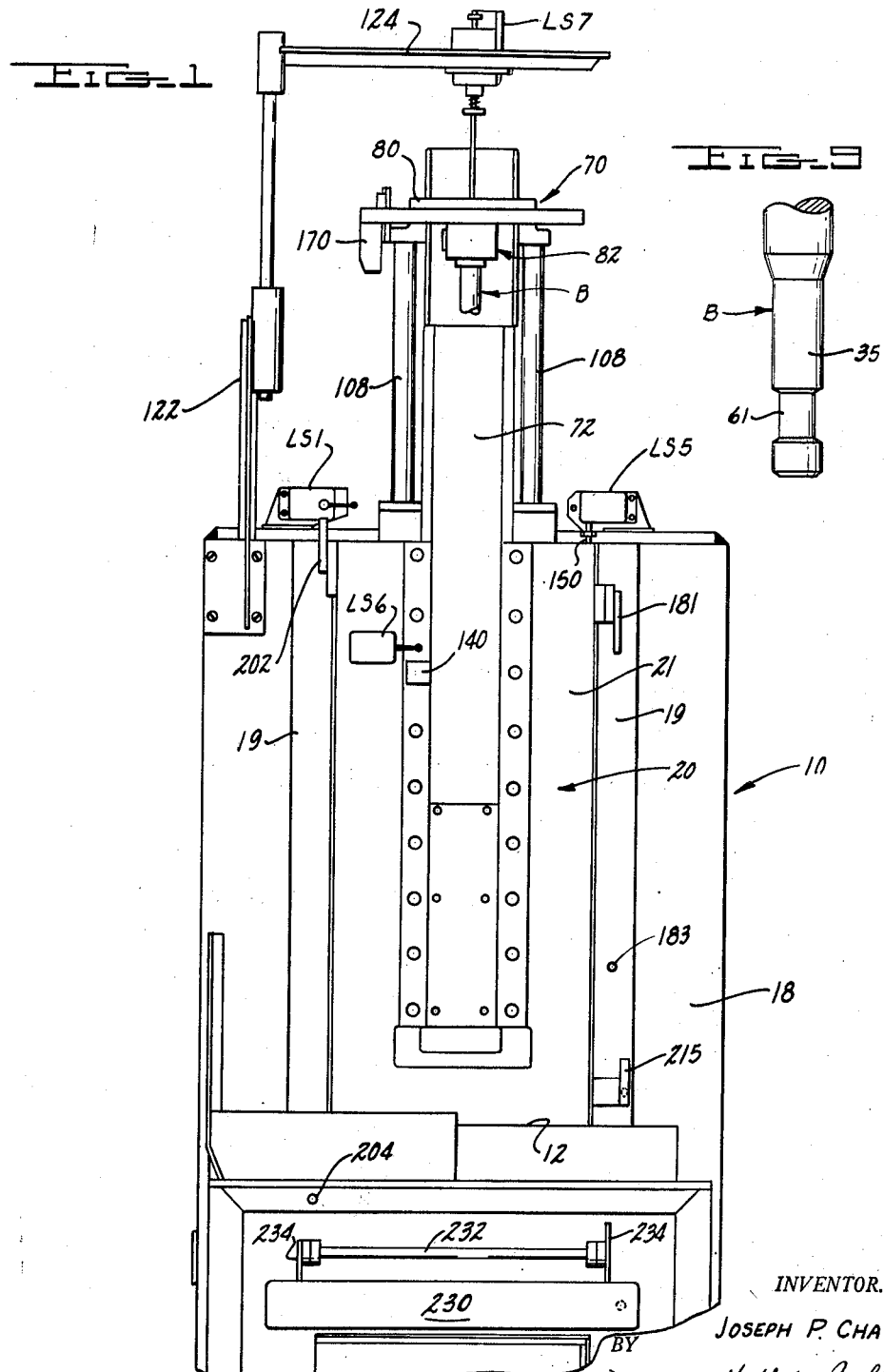
INVENTOR.
JOSEPH P. CHAYKA
BY Whittemore, Hulbert & Belknap
ATTORNEYS

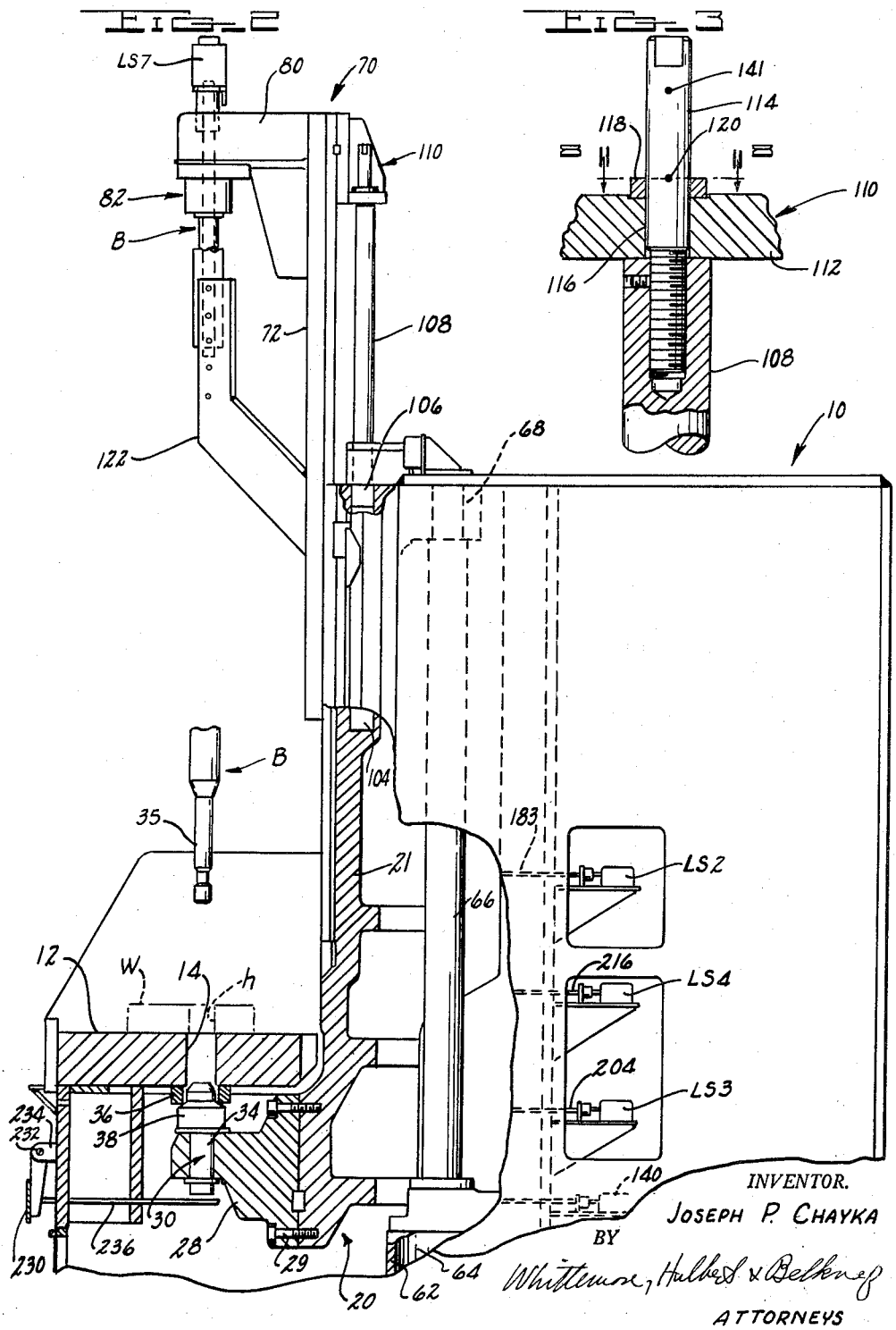

Dec. 31, 1957 J. P. CHAYKA 2,818,001
BROACHING MACHINE
Filed Jan. 16, 1956 5 Sheets-Sheet 3
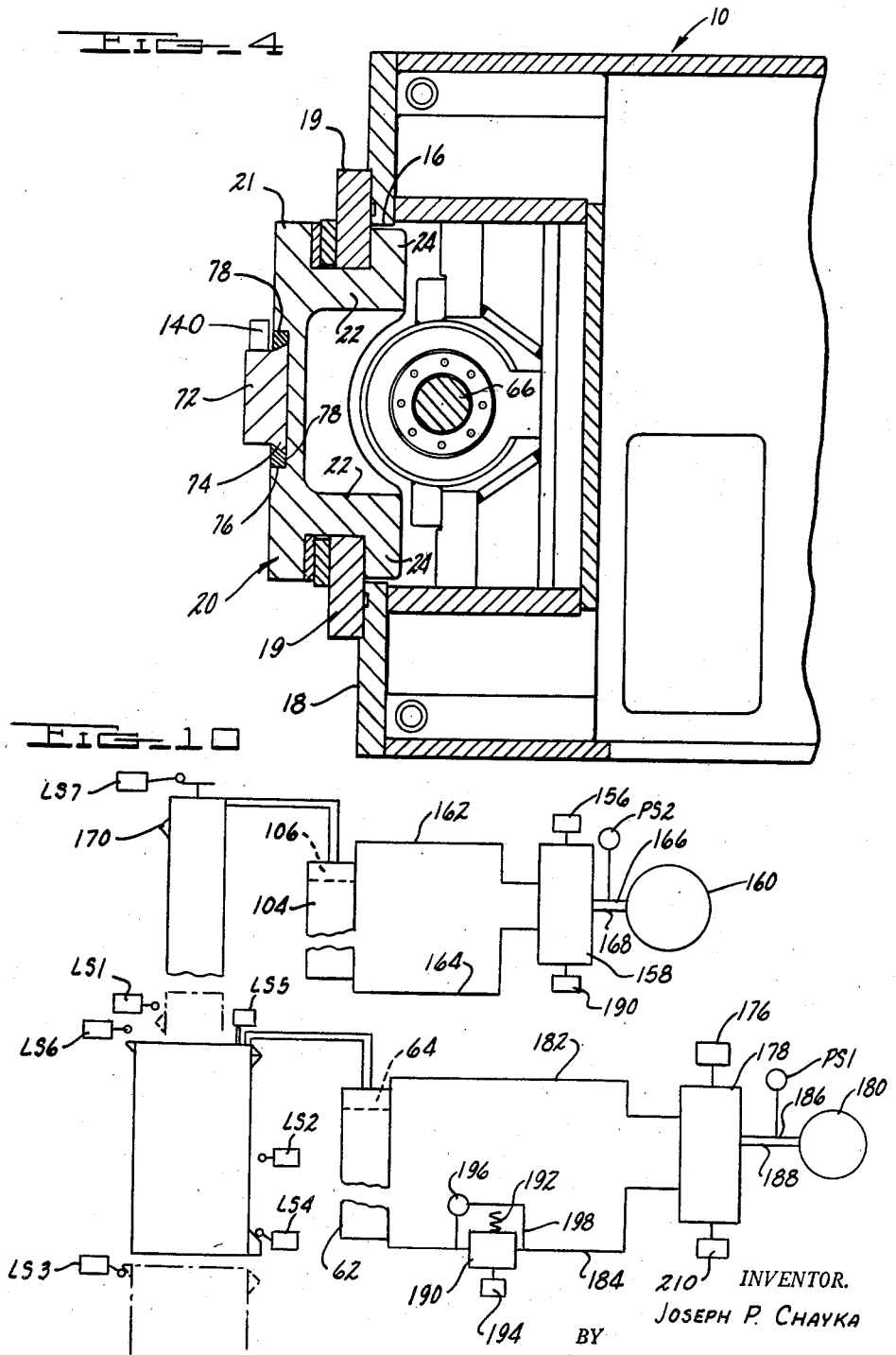
INVENTOR.
JOSEPH P. CHAYKA
BY
Whittemore, Hulbert & Belknap
ATTORNEYS

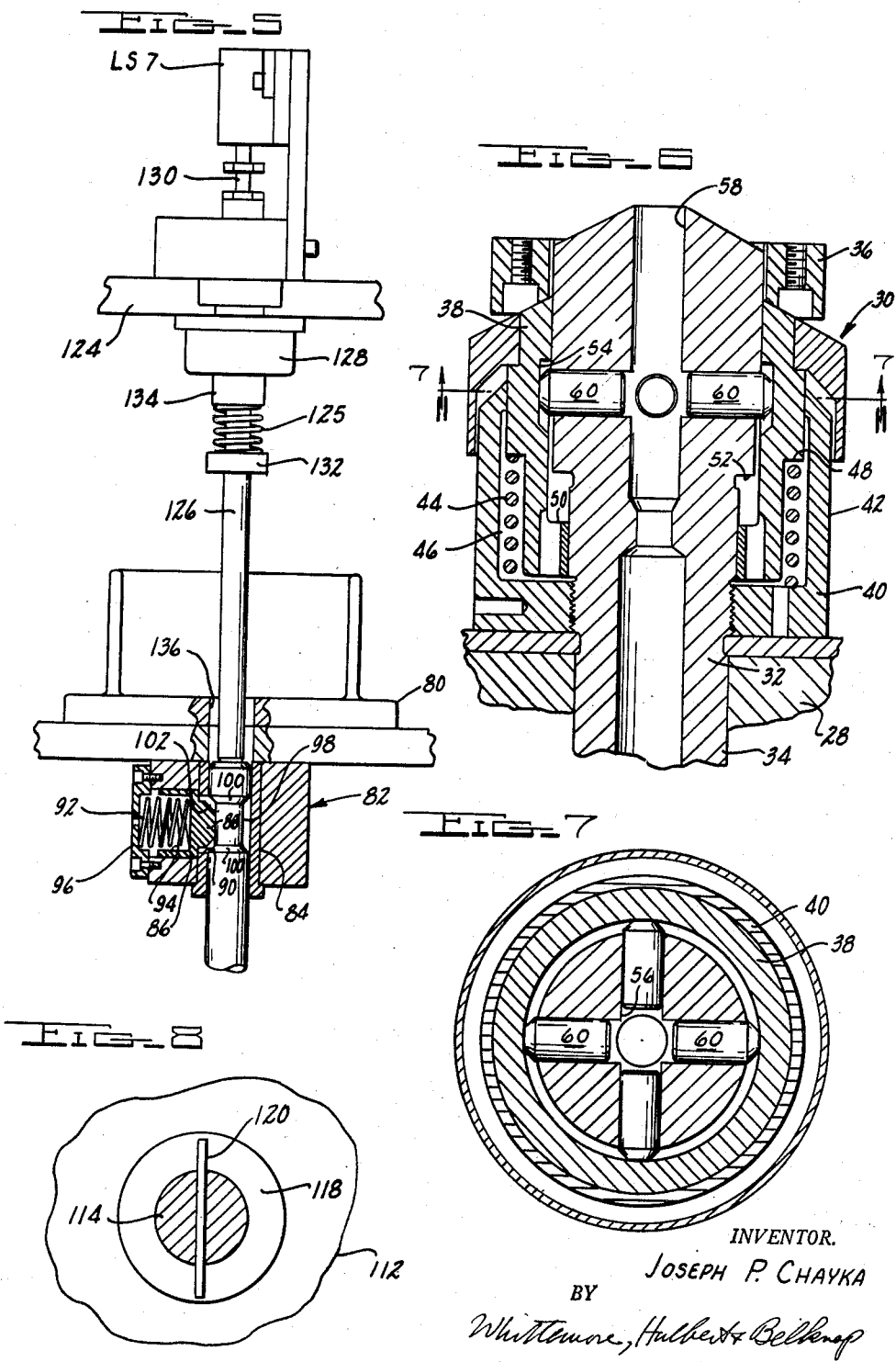

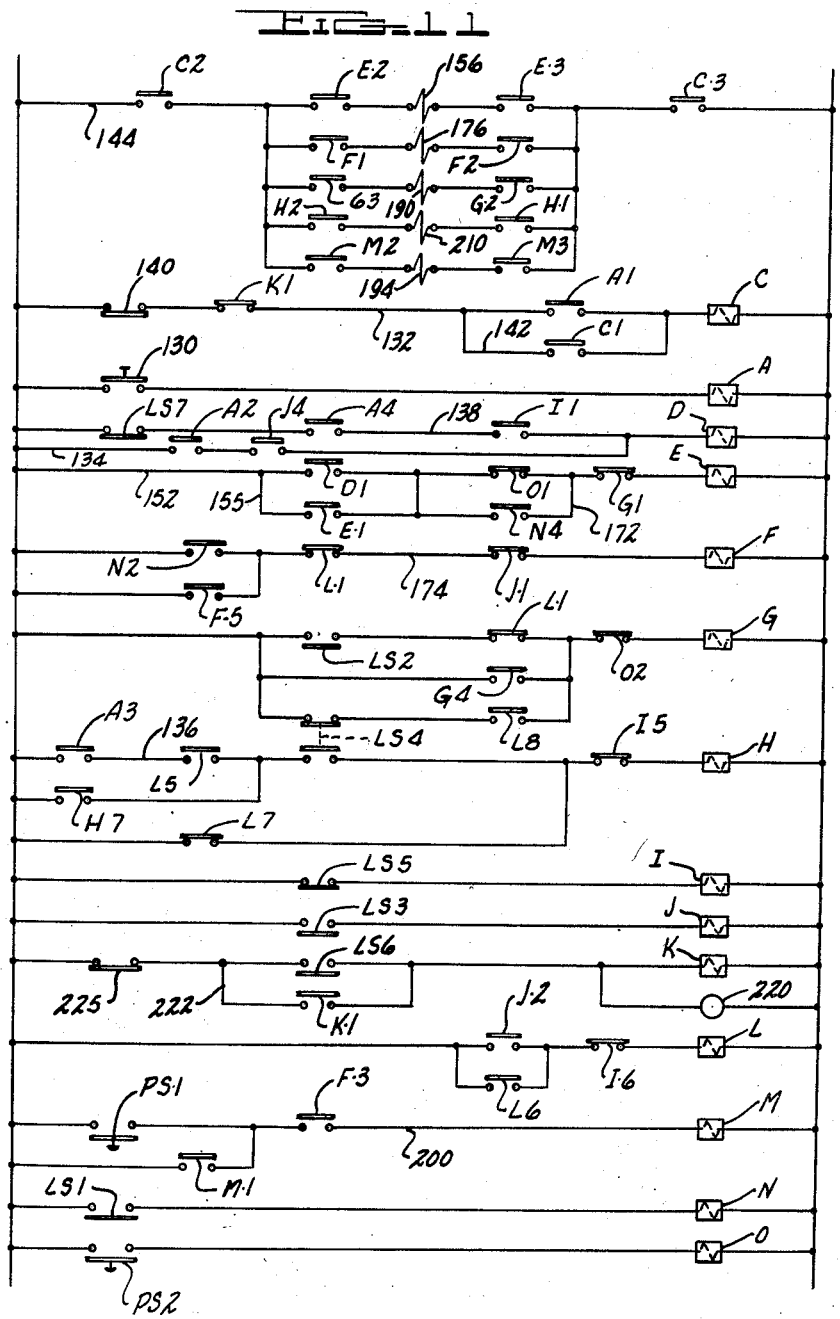

United States Patent Office 2,818,001
Patented Dec. 31, 1957

2,818,001

BROACHING MACHINE

Joseph P. Chayka, Ferndale, Mich., assignor to Detroit Broach Company, Inc., Rochester, Mich., a corporation of Michigan Application January 16, 1956, Serial No. 559,395

1 Claim. (Cl. 90—33)

This invention relates to a broaching machine, and refers more particularly to a pull down type broaching machine.

Broaching machines of the type involved herein include a table for supporting a work piece, and vertically reciprocable puller mechanism beneath the table having means thereon engageable with the lower end of a broach to pull the same through the work piece. After the work piece has been broached and the puller mechanism again elevated to its starting position preparatory to the initiation of the next cycle of operation, it is necessary to remove the broach from the puller mechanism in order to insert the next work piece on the table. For this purpose, handling mechanism is provided for gripping the upper end of the broach and taking it from the puller mechanism and raising it above the table so that the next work piece can be inserted. Thereafter, the handling mechanism is lowered to project the end of the broach through the work piece for gripping engagement by the puller mechanism.

In the normal operation of the machine, the puller mechanism moves downwardly after the broach has been inserted thereinto to pull it through the work piece. However, occasionally the puller mechanism will fail to grip the broach and will move downwardly without it. In machines of this type, the handling mechanism is ordinarily reciprocably mounted on the puller mechanism. Thus, if the broach is not picked up by the puller mechanism, the handling slide will attempt to push it. While broaches have considerable strength in tension, they ordinarily do not have much strength in longitudinal compression due to their elongated thin construction. Accordingly, the broach is apt to be broken if pushed by the handling mechanism. In extreme cases, the handling mechanism, which is slidable on the puller mechanism, may even be pushed out of its guides.

With the above in view, one object of this invention is to provide a broaching machine incorporating safety mechanism for immediately rendering the machine inoperative in the event the handling mechanism attempts to push the broach through the work.

Another object of the invention is to provide means for making it impossible to initiate a cycle of operation in the event the broach is not properly positioned in the gripper means of the handling mechanism.

Other objects of the invention will become apparent as the following description proceeds, especially when taken into conjunction with the accompanying drawings, wherein:

Figure 1 is a front elevational view of the upper portion of a broaching machine constructed in accordance with the invention.

Figure 2 is a side elevational view, partly in section, of the structure shown in Figure 1.

Figure 3 is an enlargement of a portion of Figure 2, shown partly in section.

Figure 4 is a horizontal sectional view through the machine.

Figure 5 is a view partly in section of a portion of Figure 1.

Figure 6 is a sectional view of the gripper for the puller mechanism.

Figure 7 is a sectional view taken along the line 7—7 on Figure 6.

Figure 8 is a sectional view taken along the line 8—8 on Figure 3.

Figure 9 is an elevational view of the lower end of a broach.

Figure 10 is a schematic view showing the main slide and handling slide and the hydraulic mechanism for operating the same.

Figure 11 is a wiring diagram.

Referring now more particularly to the drawings and especially to Figures 1, 2 and 4, the broaching machine will be seen to comprise a frame 10 on which is rigidly positioned a horizontal table 12 for supporting work pieces to be broached. The table is provided with a vertical passage 14 through which the broach is moved during the broaching operation. The machine has a vertically extending opening 16 in the front wall 18 and along the vertically extending sides of the opening 16 are secured a pair of vertically extending guides 19. The puller mechanism is indicated at 20 and includes a main slide 21 which has the rearwardly extending parts 22 and the laterally outwardly extending parts 24 integrally connected with the rear ends of the parts 22, the parts 22 and 24 respectively overlying the lateral inner edges and the rear sides of the guides 19. The main slide 21 is thus supported for vertical sliding movement on the guides 19 of the machine and in Figures 1 and 2 the main slide is shown in its upper limiting position.

The puller mechanism 20 also comprises a supporting bracket 28 secured to the main slide by fasteners 29. A gripper mechanism 30 is carried by the supporting bracket 28. The gripper mechanism has an elongated tubular part 32, the lower end 34 of which extends through a vertical opening in the supporting bracket and is secured therein against movement. The lower end portion 35 of a broach B is slidable in the tubular passage 58 of part 32. When the main slide is in the upper position illustrated in Figure 2, the ring 36, which is secured to the underside of the table and which encircles the opening 14, engages the sleeve 38 which is slidable on the tubular part 32 and forces the sleeve downwardly to the position shown in Figure 6. A cup-shaped member 40, through the base of which the tubular part extends and to which it is secured, has its side wall 42 surrounding the sleeve 38, and a coil spring 44 encircles the sleeve 38 and is disposed in the annular space 46 provided between the sleeve and the cup, being compressed between the base of the cup and the annular shoulder 48 on the sleeve. Spring 44 normally urges the sleeve 38 upwardly to the limiting position in which the annular shoulder 50 thereon engages the annular shoulder 52 on the tubular part.

In the position of the main slide shown on Figure 2 in which the gripper mechanism assumes the position shown in Figure 6, the annular groove 54 in the inner surface of the sleeve 38 surrounds the four angularly spaced passages 56 in the tubular part which lead from the tubular passage 58 therein to the outer surface thereof. In the Figure 6 position of the sleeve, the clamping pins 60, slidable in passages 56, are permitted to shift outwardly to the position shown so that the lower end 35 of broach B is freely slidable in passage 58 without interference from pins 60. However, when the handling slide moves downwardly away from the table, the sleeve 38 is enabled to assume its upper limiting position in which the clamping pins 60 are cammed inwardly by the inner surface of the sleeve beneath the annular groove 54 so that the inner ends of the pin firmly clamp the reduced neck 61 near the lower end of the broach. Thus, when the main slide moves downwardly, the lower end of a broach projecting into the gripper mechanism 30 is firmly gripped and pulled through a work piece supported on the table.

The main slide is reciprocated by a hydraulic cylinder 62 having a piston 64 therein. A rod 66 extends from the piston through the end of the cylinder and is connected to the main slide as indicated at 68.

In the operation of the machine, a work piece W is placed upon the table with the hole ($h$) therein to be broached vertically aligned with the opening 14 in the table. The lower end of a broach B is then inserted through the hole in the work piece and through the opening 14 in the table into the tubular passage 58 in the gripper mechanism 30 with neck 61 of the broach aligned with pins 60. Then, when the main slide moves downwardly, the pins 60 of the gripper mechanism firmly grip the broach and pulls it through the work. After the broach has been pulled completely through the work, the work is removed from the table and the main slide is moved up to the Figure 2 position in which the broach remains supported in the gripper mechanism but ungripped thereby. It is necessary to lift the broach out of the gripper mechanism and above the table in order to permit inserting another work piece on the table for broaching. This is accomplished by the handling mechanism 70.

The handling mechanism 70 includes a slide 72, the rear portion of which is flared or dove-tailed laterally outwardly as indicated at 74 in Figure 4. The dove-tailed portion of the slide 72 is received in the vertical recess 76 in the front face of the main slide, being secured therein for vertical sliding movement by the vertically extending beveled guides 78.

The handling slide mechanism also includes a bracket 80 carried by the slide 72 at the upper end thereof, and the bracket 80 supports the gripper mechanism 82. The gripper mechanism 82 includes a block 84 having a vertically extending through passage therein in which is secured a tubular sleeve 84. A clamping member 86 is slidably supported in a lateral passage in block 84 and has a nose 88 at the front end which projects into the sleeve 84 through an opening 90 in the side thereof. The clamping member 86 is urged inwardly by a coil spring 92 which is compressed between the base of the recess 94 in the outer end of the gripping member and a removable plate 96 secured to the block 84 and covering the lateral passage therein.

The upper end portion of the broach has a reduced neck 98 and tapered frusto-conical portions 100 connecting the neck 98 with the main body of the broach. The nose of the clamping member 86 has its sides beveled as shown at 102 so that the broach can be pulled out of clamping relation with the clamping member 86 by pulling it longitudinally to cam the nose outwardly. However, the clamping member 86 bears against the neck 98 of the broach with sufficient pressure to hold it against falling out. The sleeve 84 is vertically aligned with the tubular passage 58 in the clamping part 32 of the gripping mechanism 30 carried by the main slide. Thus, by vertically reciprocating the handling slide relative to the main slide, a broach carried by the handling slide can be lowered into gripping relation with the main slide gripping mechanism 30 or a broach can be lifted out of the main slide gripping mechanism.

The main slide is formed with a pair of cylinders 104 which extend vertically and have pistons 106 therein. Rods 108 extend through the cylinders and are connected to the pistons. The upper ends of the rods 108 are secured to a bracket 110 carried by the handling slide. Referring to Figure 3, it will be seen that the bracket 110 has a plate portion 112 which overlies the upper ends of rods 108, and pins 114 extend through vertical passages 116 in the plate portion 112. The lower ends of the pins threadedly engage in the upper ends of the rods and a washer 118 is loosely sleeved over each pin above the plate portion. The washers are held down against the plate portion by shear pins 120 which extend through the respective pins 114 and overlie the washers. These shear pins have limited strength and are designed to break under a predetermined load as will appear below.

A frame 122 is rigidly secured to the main frame 10 of the machine and has an arm 124 which extends over the bracket 80 of the handling mechanism. A vertical rod 126 is slidably supported in a part 128 carried by the arm 124 and has a portion 130 which extends upwardly through arm 124. A coil spring 125 encircles rod 126 and is compressed between abutments 132 and 134 on the rod and on the part 128 respectively to normally urge the rod downwardly. However, the lower end of rod 126 extends through an opening 136 in bracket 80 for engagement with the upper end of broach B when the latter is properly gripped by the gripper mechanism 82 of the handling mechanism 70 and the handling mechanism 70 is at its upper limit shown in Figures 2 and 5. When rod 126 is thus engaged by the broach, it is moved upwardly to the position of Figure 5, against the action of spring 125, and its upper portion 130 actuates limit switch $LS^7$. Unless limit switch $LS^7$ is actuated by a properly positioned broach, the handling slide cannot be lowered from the upper limiting position of Figure 2 and a cycle of operation cannot be initiated.

A limit switch $LS^6$ is carried by the main slide for actuation by a cam 140 on the handling slide. The range of the handling slide normally will not bring cam 140 into engagement with limit switch $LS^6$ since it is below the latter in the upper limit of the handling slide (see Figure 2). However, should the handling slide move up beyond its normal upper limit, as when the shear pins 120 break, the limit switch $LS^6$ may be actuated.

In Figure 3, it will be seen the pins 141 extend through and extend beyond opposite sides of pins 114. Pins 141 are provided to retain washers 118 from flying off the pins 114 in the event shear pins 120 break.

In the Figure 2 position of the main slide and handling slide, the gripper mechanism 30 is in position to receive the broach and the handling mechanism holds the broach above the table so that the work piece can be located thereon. When a cycle of operation is commenced, the handling slide moves down to insert the lower end of the broach through the work piece and into the gripper mechanism 30, pins 60 being outward to permit the free insertion of the broach with the neck 61 of the broach aligned with pins 60. Thereafter, the main slide moves down to permit pins 60 to grip the neck 61 and to pull the broach through the work. The handling slide then moves to its upper limit. The main slide moves to its lower limit to pull the broach completely through the work and beneath the top surface of the table.

Thereafter the work piece is removed from the table and the second half of the cycle is initiated to raise the main slide and lower the handling slide. When the main slide reaches its upper limit, shown in Figure 2, the gripper mechanism 30 releases the broach and the gripper mechanism 82 of the handling slide receives the upper end of the broaching and the handling slide moves up to the upper limit shown in Figure 2 in readiness for the next cycle.

The cycle of operation will be described in detail in connection with the wiring diagram of Figure 11. In this diagram, the contacts are operated by the relays bearing the corresponding letter of the alphabet. The limit switches $LS^1$—$LS^7$ are shown open or closed in accordance with their position in the hydraulic diagram of Figure 10. The manually controlled start button is indicated at 130. When the start button is momentarily closed the relay A is energized thereby closing contacts $A^1$ in circuit 132, A² in circuit 134, A³ in circuit 136 and A⁴ in circuit 138. The relay C is thereby energized through the normally closed stop button 140 and the normally closed contact K¹ and is held closed by the normally open contact C¹ in the holding circuit 142. Contacts C² and C³ in circuit 144 are closed making it possible to energize the solenoids which control the operation of the main slide and handling slide. Closing of the contact A⁴ in circuit 138 energizes relay D through the closed limit switch LS⁷ and the closed contact I¹. The limit switch LS⁷ is closed by the upper end of a broach properly positioned in the handling slide when the latter is at its upper limit. If the broach is not properly positioned in the handling slide it will not close limit switch LS⁷ and a cycle of operation cannot be initiated. The contact I¹ in circuit 138 is closed by reason of the fact that limit switch LS⁵ is closed to energize relay I. Limit switch LS⁵ is closed by reason of the upper edge of the main slide engaging the operating plunger 150 on the limit switch in the upper position of the main slide.

Energization of relay D closes contact D¹ in circuit 152 to energize relay E through the normally closed contacts O¹ and G¹. Relay E has a normally open contact E¹ in the holding circuit 155 so that the relay E remains energized after de-energization of the relay D. Relay E also has contacts E² and E³ in the circuit of the handling slide solenoid 156 to close the circuit and energize the solenoid. Energization of solenoid 156 shifts the valve 158 to a position in which hydraulic fluid from pump 160 is supplied to the upper ends of cylinders 104 via lines 162 and fluid is returned to the pump from the lower end of cylinder 104 via lines 164. The valve 158 normally assumes a neutral position in which the fluid supplied by pump 160 through line 166 is returned to the pump via line 168. However, when solenoid 156 is energized, the valve is shifted as indicated.

As noted above, if LS⁷ is not closed by a properly positioned broach, relay D cannot be energized and hence relay E, which initiates downward movement of handling slide 72, cannot be energized. Limit switch LS⁷ thus requires that the broach be properly positioned in the handling slide, as shown in Figure 5, before a cycle of operation can commence. If the broach is not properly gripped by the handling slide, it may not enter the work or the gripper mechanism 30 of the main slide properly, and it may even fall out of the handling slide.

The handling slide continues to move downwardly and the switch cam 170 thereon actuates limit switch LS¹ closing the latter to energize relay N. Energization of relay N closes contact N¹ in the circuit 172 of relay E and also closes contact N² in the circuit 174 of relay F to energize the relay through the normally closed contacts L¹ and J¹. Energization of relay F closes contacts F¹ and F² to energize solenoid 176 to initiate downward movement of the main slide. Specifically, energization of solenoid 176 shifts valve 178 to a position in which hydraulic fluid from pump 180 is supplied to the upper end of cylinder 62 via line 182 and fluid is returned to the pump from the lower end of the cylinder via line 184. Valve 178 normally assumes a neutral position in which the fluid supplied by pump 180 through line 186 is returned to the pump via line 188. However, when the solenoid 176 is energized, the valve is shifted as indicated.

As the handling slide approaches its lower limit, the pressure in line 166 from the pump increases, closing pressure switch PS² and closing the circuit through relay O energizing the latter. As a result, the contacts O¹ and O² are opened. Since contact O¹ is opened, the energizing current for relay E flows through circuit 172. However, as the handling slide reaches its lower limit of movement, its switch cam 170 passes beneath limit switch LS¹ to open the latter with the result that contact N⁴ in circuit 172 is opened to de-energize relay E thereby stopping downward movement of the handling slide. The main slide continues to move down until the switch cam 181 thereon engages the actuating plunger 183 of limit switch LS² to close the latter.

Energization of relay G closes the contacts G², G³ and G⁴ and opens the normally closed contact G¹. Closing of contacts G² and G³ energize solenoid 190 to shift valve 158 to a position in which the output of the pump 160 is directed to cylinder 104 beneath the piston and the cylinder above the piston is exhausted to send the handling slide up.

At approximately the time the handling slides trip LS¹ to send the main slide down, the lower end of the broach is inserted into the gripping mechanism of the main slide so that when the main slide moves away from the table the broach is securely gripped thereby.

As the handling slide reaches the top, the pressure in line 166 increases to again close pressure switch PS² opening the normally closed contact O² to de-energize relay G and stop the upward movement of the handling slide.

As seen in Figure 10, a foot valve 190 is provided in line 184 to the lower end of the handling slide cylinder and is normally urged by a spring 192 to a position restricting flow from the cylinder, but upon energization of solenoid 194, the valve is shifted to a position permitting the free flow of fluid from the cylinder. A check valve 196 is provided in a line 198 which by-passes the foot valve and permits the free and unrestricted flow of fluid to cylinder 62 around the foot valve while blocking the flow through line 198 from the cylinder. At the start of the main slide downward movement, the pressure in line 186 from the pump 180 increases as the broach engages the work and closes pressure switch PS¹ to energize relay M through the contact F³ in circuit 200. Contact F³ is closed by the relay F. Energization of relay M closes contacts M¹, M² and M³, the latter two contacts closing the circuit to solenoid 194 to open the foot valve and permit the unrestricted exhaust from cylinder 162. The main slide continues down until the switch cam 202 thereon engages the plunger 204 of limit switch LS³ to close the latter. Closing of limit switch LS³ energizes relay J to open the normally closed contact J¹ and to close the normally open contact J². When the contact J¹ opens, downward movement of the main slide is stopped by deenergization of relay F and de-energization of the latter relay also opens contact F³ to de-energize relay M and thereby again closing the foot valve. At this point, the cycle stops, with the main slide at its lower limit and the handling slide at its upper limit. The upper end of the broach is beneath the table and the work piece may be removed.

It occasionally happens that the gripping mechanism of the main slide does not grip the broach but moves down without it. The handling slide is sent up by the downward movement of the main slide, but after it reaches its upper limit, it continues to move down with the main slide since it is carried thereby. Thus, if the broach was not picked up by the main slide, it may be held by the handling slide and pushed through the work by it. The resistance to movement of the broach by the handling slide is often sufficient to break the broach. Accordingly, when a predetermined resistance to movement of the broach is encountered, less than enough to break the broach, the shear pins 120 break to enable the handling slide to move up, relative to the main slide beyond its normal upper limit determined by the bottoming of piston 106 in the top of cylinder 104. The switch cam 140 of the handling slide will then engage limit switch LS⁶ to close the latter energizing relay K and also the signal light 220. Relay K has a contact K¹ in a holding circuit 222 which bypasses the limit switch. Energization of relay K opens the contact K¹ to de-energize relay C thus opening contacts C² and C³ so that all of the solenoids 156, 176, 190, 210 and 194 are de-energized to stop the machine.

Operation can be resumed only after the shear pin reset 225 is manually opened to de-energize relay K.

In order to start the main slide up, the start button 130 is again momentarily depressed to energize relay A closing contact $A^2$ and thereby energizing relay D through the contact $J^4$ which is now closed as the result of energization of relay J, the latter being energized since $LS^3$ is closed by cam 202 in the bottom position of the main slide.

Contact $D^1$ is thus closed to energize relay E to send the handling slide down and contact $A^3$ is closed to energize relay H closing contacts $H^1$ and $H^2$ to energize solenoid 210 and shift the valve 178 to a position to send the main slide up. The relay H is energized through the normally closed contact $I^5$ the switch $LS^4$, which is shifted from the position shown, and through the contact $L^5$. Contact $L^5$ is closed because relay L is energized by contact $J^2$ which is closed by relay J. Contact $I^6$ is normally closed and contact $L^6$ provides holding circuit for relay L.

The handling slide continues down until it approaches its lower limit, at which point the pressure switch $PS^2$ is opened to stop the downward movement of the handling slide.

The main slide continues up and the switch cam 215 thereon engages the operating plunger 216 of limit switch $LS^4$ to shift the latter to the position shown in Figure 11 thereby closing the circuit to relay G through contact $L^8$ which is closed by reason of the energization of relay L. The handling slide then moves up.

When limit switch $LS^4$ shifts to the position shown, relay H, which causes the upward motion of the main slide, is de-energized. The main slide continues to coast up and closes limit switch $LS^5$, de-energizing relay L thus opening contact $L^8$. The handling slide moves up until pressure switch $PS^2$ closes as the slide reaches the top, stopping upward movement thereof by opening contact $O^2$. The cycle ends and the main slide and handling slide are in their upper positions shown in Figure 2 whereupon another work piece may be placed on the table.

If the main slide should drift down, $LS^5$ would be opened, de-energizing relay I to close contact $I^5$ and energize relay H, sending the main slide back up.

This safety limit switch $LS^6$ is important in protecting the broach against damage when it may be pushed by the handling slide and also in extreme cases it prevents the handling slide from actually being pushed out of its ways on the main slide.

The manual stop 140 is operated by a lever 230 pivoted to the front of the machine for rocking movement about the axis of pivot 232 carried by brackets 234, and the lever 230 engages the operating plunger 236 of the stop switch 140 to open the latter when the lever 230 is depressed, thereby stopping the machine.

What I claim as my invention is:

In a broaching machine, a frame, a main slide mounted on said frame for movement in opposite directions, power means for moving said main slide, said main slide having gripping means axially fixed thereon engageable with one end of a broach to pull the same past a work piece upon movement of said main slide in one direction, and a handling slide mounted on said main slide for movement in opposition directions relative to said main slide, power means carried by said main slide for moving said handling slide comprising a double-acting fluid cylinder having a piston therein bottoming in said main slide normally limiting the movement of said handling slide in the direction of said main slide broach gripping means, said handling slide including means axially fixed thereon releasably engageable with the other end of the broach and operable to feed said broach in said one direction to and through a work piece and its supporting means into operative engagement with the broach gripping means on said main slide, a rod extending from the piston rod of said double-acting cylinder, the said handling slide being telescopingly mounted on said rod and slidable thereon only in a direction opposite to the movement thereof when feeding said broach through said work piece and its supporting means, means releasably fixing said handling slide against said slidable movement on said piston rod extension releasably responsive to a broach carried by said handling slide encountering an obstruction to its being fed through said work piece and its supporting means and into operative engagement with said main slide broach gripping means, and means rendering said handling slide power means inoperative responsive to slidable movement of said handling slide in respect to said piston rod extension.

References Cited in the file of this patent

UNITED STATES PATENTS

| | | |
|---|---|---|
| 1,281,629 | Monahan | Oct. 15, 1918 |
| 1,635,234 | Taylor | July 12, 1927 |
| 2,253,303 | La Pointe | Aug. 19, 1941 |
| 2,395,702 | Welte | Feb. 26, 1946 |
| 2,539,981 | Welte | Jan. 30, 1951 |